(12) United States Patent
Ikeda et al.

(10) Patent No.: US 12,051,536 B2
(45) Date of Patent: Jul. 30, 2024

(54) ELECTRONIC DEVICE

(71) Applicant: SHINDENGEN ELECTRIC MANUFACTURING CO., LTD., Tokyo (JP)

(72) Inventors: Kosuke Ikeda, Saitama (JP); Yoshiaki Hiruma, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 757 days.

(21) Appl. No.: 17/256,614

(22) PCT Filed: Jun. 29, 2018

(86) PCT No.: PCT/JP2018/024764
§ 371 (c)(1),
(2) Date: Dec. 28, 2020

(87) PCT Pub. No.: WO2020/003481
PCT Pub. Date: Jan. 2, 2020

(65) Prior Publication Data
US 2021/0272749 A1 Sep. 2, 2021

(51) Int. Cl.
*H01F 27/32* (2006.01)
*H01F 27/22* (2006.01)
*H01F 27/29* (2006.01)

(52) U.S. Cl.
CPC .......... *H01F 27/327* (2013.01); *H01F 27/22* (2013.01); *H01F 27/29* (2013.01)

(58) Field of Classification Search
CPC ........ H01F 27/327; H01F 27/22; H01F 27/29; H01F 27/2876; H02M 3/003; H02M 1/0064
See application file for complete search history.

(56) References Cited

U.S. PATENT DOCUMENTS

2002/0135236 A1* 9/2002 Haigh ................. H01L 23/5227
307/91
2008/0179963 A1* 7/2008 Fouquet ................. H01F 19/08
336/200

(Continued)

FOREIGN PATENT DOCUMENTS

JP   H05283247 A   10/1993
JP   2000173839 A   6/2000

(Continued)

OTHER PUBLICATIONS

Office Action for Japanese Patent Application 2020-526842 issued on May 17, 2022 with English translation from Global Dossier.

(Continued)

*Primary Examiner* — Mang Tin Bik Lian
(74) *Attorney, Agent, or Firm* — Ladas & Parry, LLP

(57) ABSTRACT

An electronic device has a primary coil 10; a secondary coil 20 disposed to face the primary coil 10; a coil sealing part 50 sealing the primary coil 10 and the secondary coil 20 and being made of sealing resin; a primary-side sealing part 150 sealing a primary-side electronic element 110 electrically connected to the primary coil 10; and a secondary-side sealing part 250 sealing a secondary-side electronic element 210 electrically connected to the secondary coil 20.

9 Claims, 13 Drawing Sheets

(56) References Cited

U.S. PATENT DOCUMENTS

| | | | | |
|---|---|---|---|---|
| 2008/0311862 | A1* | 12/2008 | Spina | H01Q 1/38 455/78 |
| 2009/0243782 | A1* | 10/2009 | Fouquet | H03F 3/45192 336/200 |
| 2009/0243783 | A1* | 10/2009 | Fouquet | H01F 27/2804 336/200 |
| 2010/0020448 | A1* | 1/2010 | Ng | H03F 3/45475 336/200 |
| 2010/0164670 | A1* | 7/2010 | Nakahori | H05K 1/165 336/200 |
| 2013/0308648 | A1* | 11/2013 | Shamis | H04L 47/2491 370/395.53 |
| 2014/0277223 | A1* | 9/2014 | Boone | H01F 41/005 29/606 |
| 2016/0035480 | A1* | 2/2016 | Hachiya | H01F 27/22 336/200 |
| 2017/0086740 | A1* | 3/2017 | Boone | A61B 5/686 |
| 2017/0345756 | A1* | 11/2017 | Yin | H05K 1/165 |
| 2019/0371514 | A1* | 12/2019 | Ogawa | H01F 27/24 |

FOREIGN PATENT DOCUMENTS

| | | |
|---|---|---|
| JP | 2012231616 A | 11/2012 |
| JP | 2014056868 A | 3/2014 |
| JP | 2014093926 A | 5/2014 |
| JP | 2014131395 A | 7/2014 |
| JP | 2015089146 A | 5/2015 |
| JP | 2015159174 A | 9/2015 |

OTHER PUBLICATIONS

International Search Report in the international application No. PCT/JP2018/024764, mailed on Jul. 8, 2018, and its English translation provided by WIPO.
Written Opinion in the international application No. PCT/JP2018/024764, mailed on Jul. 8, 2018, and its English translation provided by Google Translate.
Extended European Search Report from EP app. No. 18924285.2, dated Feb. 9, 2022, all pages.

* cited by examiner

ELECTRONIC DEVICE

CROSS-REFERENCE TO RELATED APPLICATION

The present application is the U.S. national phase of PCT Application No. PCT/JP2018/024764 filed on Jun. 29, 2018, the disclosure of which is incorporated herein by reference in its entirety.

TECHNICAL FIELD

The present invention relates to an electronic device that has a primary coil and a secondary coil.

BACKGROUND ART

Conventionally, in an electronic device, such as a transformer, that has a primary coil and a secondary coil, an insulating sheet has been generally provided between wiring lines that constitute each of the coils, in order to maintain electrical insulation in each of the coils. However, in a case where such an insulating sheet is provided, a space is inevitably formed between insulating sheets, and therefore there is a problem of a reduction in thermal conductivity.

JP 2014-56868 A has proposed that heat dissipation is secured by using resin having satisfactory thermal conductivity. However, from the viewpoint of heat dissipation, this cannot be said to be sufficient yet.

Furthermore, conventionally, it has been proposed that a coil is sealed with resin, as disclosed in JP 05-283247. However, it has been only proposed that one coil is simply sealed with resin.

SUMMARY OF INVENTION

Problem to be Solved by Invention

The present invention provides an aspect that enables thermal conductivity and heat dissipation to be further enhanced in an electronic device that has a primary coil and a secondary coil.

Means for Solving Problem

Concept 1

An electronic device may comprise:
a primary coil;
a secondary coil disposed to face the primary coil;
a coil sealing part sealing the primary coil and the secondary coil and being made of sealing resin;
a primary-side sealing part sealing a primary-side electronic element electrically connected to the primary coil; and
a secondary-side sealing part sealing a secondary-side electronic element electrically connected to the secondary coil.

[Concept 2]
In the electronic device according to concept 1,
the primary coil and a primary-side terminal extending to an inside of the primary-side sealing part may be integrated.

[Concept 3]
In the electronic device according to concept 1 or 2,
the secondary coil and a secondary-side terminal extending to an inside of the secondary-side sealing part may be integrated.

[Concept 4]
In the electronic device according to any one of concepts 1 to 3,
the primary coil may have a first coil and a second coil coupled to the first coil.

[Concept 5]
The electronic device according to any one of concepts 1 to 4 may further comprise a first electronic module that has the primary-side electronic element and the primary-side sealing part, wherein
the first electronic module may have a primary-side substrate and a primary-side conductor layer provided on the primary-side substrate.

[Concept 6]
The electronic device according to any one of concepts 1 to 5 may further comprise a second electronic module that has the secondary-side electronic element and the secondary-side sealing part,
the second electronic module has a secondary-side substrate and a secondary-side conductor layer provided on the secondary-side substrate.

[Concept 7]
In the electronic device according to any one of concepts 1 to 6,
the primary coil and a primary-side terminal extending to an inside of the primary-side sealing part may be integrated, and
a first bent part may be provided between the coil sealing part and the primary-side sealing part, and in the primary-side terminal.

[Concept 8]
In the electronic device according to any one of concepts 1 to 7,
the secondary coil and a secondary-side terminal extending to an inside of the secondary-side sealing part may be integrated, and
a second bent part may be provided between the coil sealing part and the secondary-side sealing part, and in the secondary-side terminal.

[Concept 9]
In the electronic device according to any one of concepts 1 to 8,
the primary coil and a primary-side terminal extending to an inside of the primary-side sealing part may be integrated,
a first bent part may be provided between the coil sealing part and the primary-side sealing part, and in the primary-side terminal,
the secondary coil and a secondary-side terminal extending to an inside of the secondary-side sealing part may be integrated,
a second bent part may be provided between the coil sealing part and the secondary-side sealing part, and in the secondary-side terminal and
a back surface of the coil sealing part, a back surface of the primary-side sealing part, and a back surface of the secondary-side sealing part may be able to abut onto a cooling body.

Effect of Invention

As an aspect of the present invention, in a case where an aspect in which the coil sealing part sealing the primary coil and the secondary coil and being made of sealing resin is provided has been employed, an insulating sheet that has been conventionally used does not need to be provided, and as a result, a space that is inevitably formed between insulating sheets can be eliminated. Therefore, thermal conductivity can be increased, and heat dissipation can be enhanced.

DESCRIPTION OF EMBODIMENTS

First Embodiment

Configuration

Figure 3:
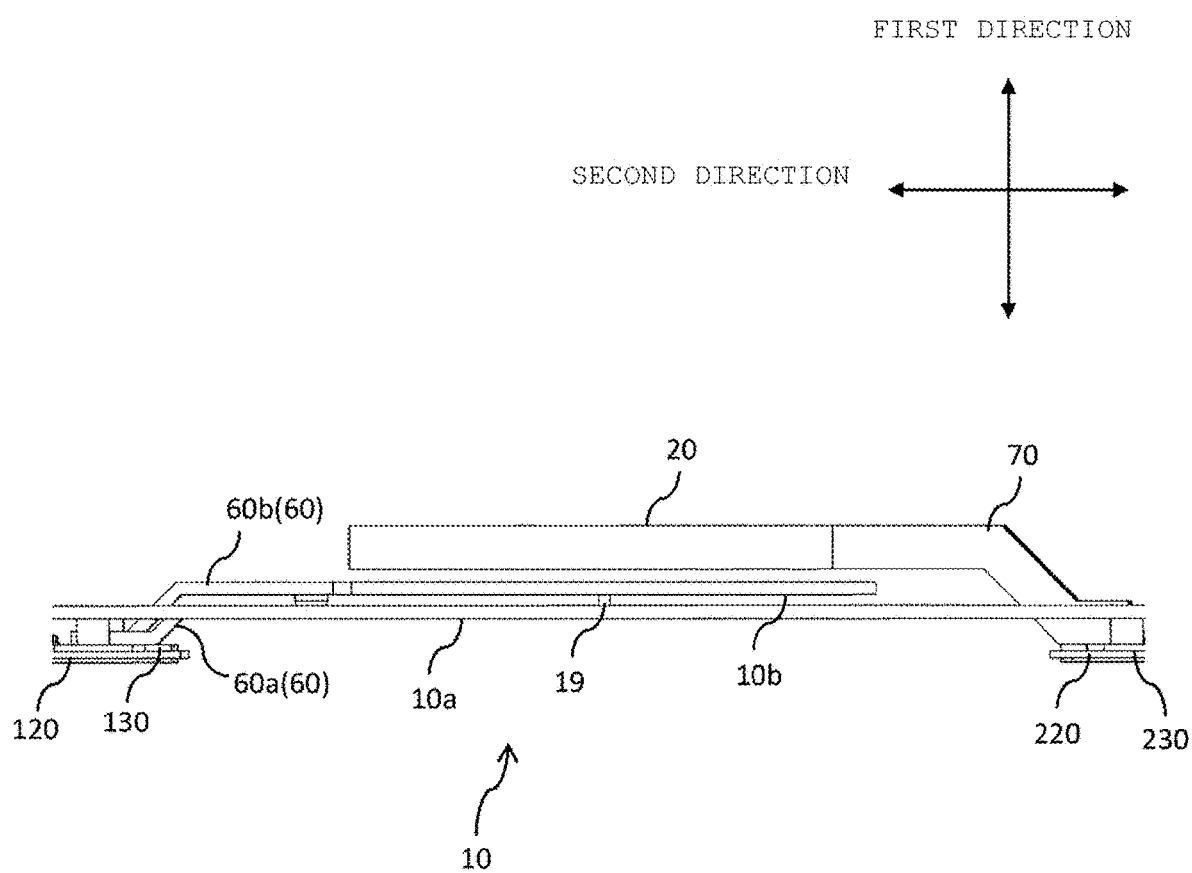
FIG. 3 is a side view illustrating a primary coil and a secondary coil that can be used in the first embodiment of the present invention.

In the present embodiment, "one side" means an upper side in FIG. 3, and "another side" means a lower side in FIG. 3. An upward or downward direction in FIG. 3 is referred to as a "first direction", a leftward or rightward direction is referred to as a "second direction", and directions of front and reverse sides of paper are referred to as a "third direction". An in-plane direction including the second direction and the third direction is referred to as a "plane direction".

Figure 1:
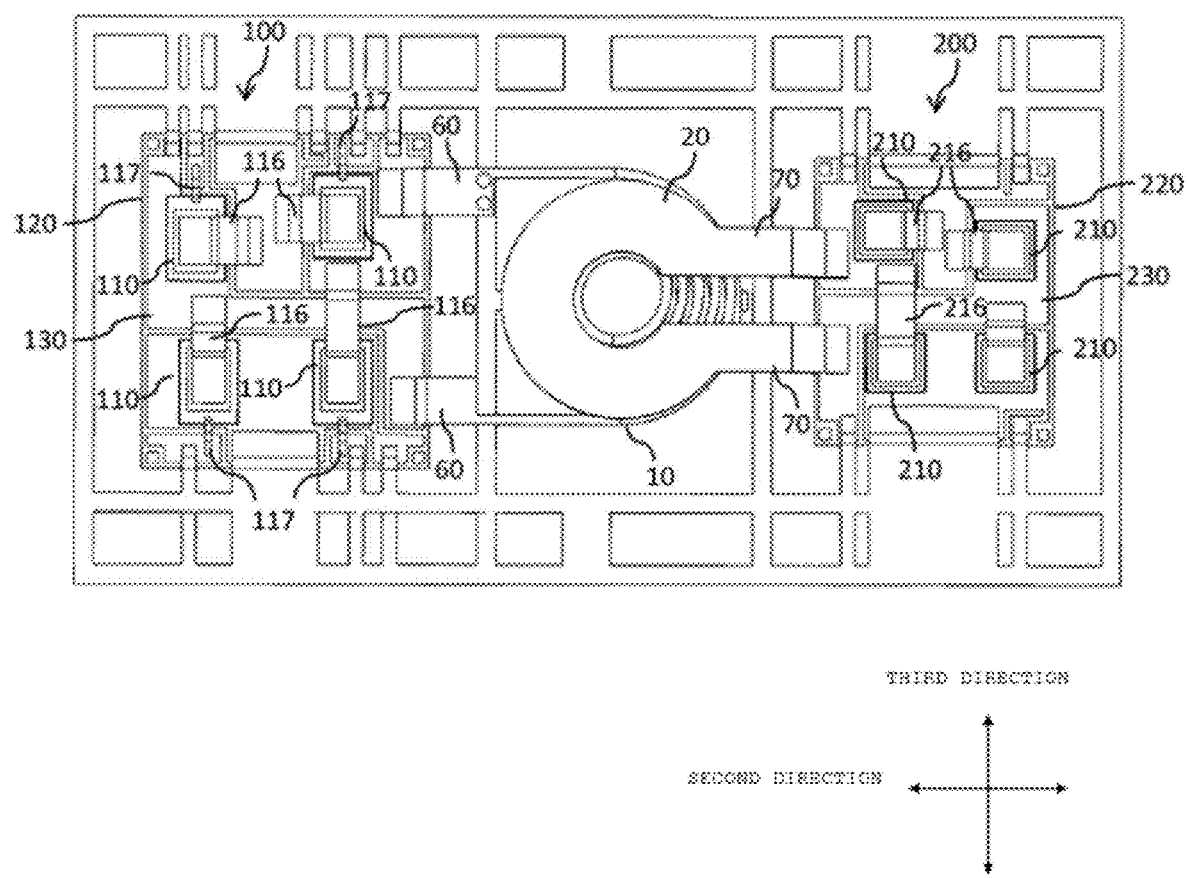
FIG. 1 is a plan view illustrating a state before an electronic device that can be used in a first embodiment of the present invention is separated from a lead frame.

As illustrated in FIG. 1, an electronic device according to the present embodiment may have a primary coil 10, a secondary coil 20 (see FIG. 3) that is disposed to face the primary coil 10 on one side or another side of the primary coil 10, a coil sealing part 50 (see FIG. 2) with which the primary coil 10 and the secondary coil 20 are sealed and that is made of sealing resin, a primary-side sealing part 150 (see FIG. 2) sealing a primary-side electronic element 110 electrically connected to the primary coil 10, and a secondary-side sealing part 250 (see FIG. 2) sealing a secondary-side electronic element 210 electrically connected to the secondary coil 20. The primary coil 10 may be constituted of a lead frame, and an aspect illustrated in FIG. 1 indicates a primary coil 10 that is made from the lead frame. A thickness of the secondary coil 20 may be greater than a thickness of the primary coil 10.

Figure 2:
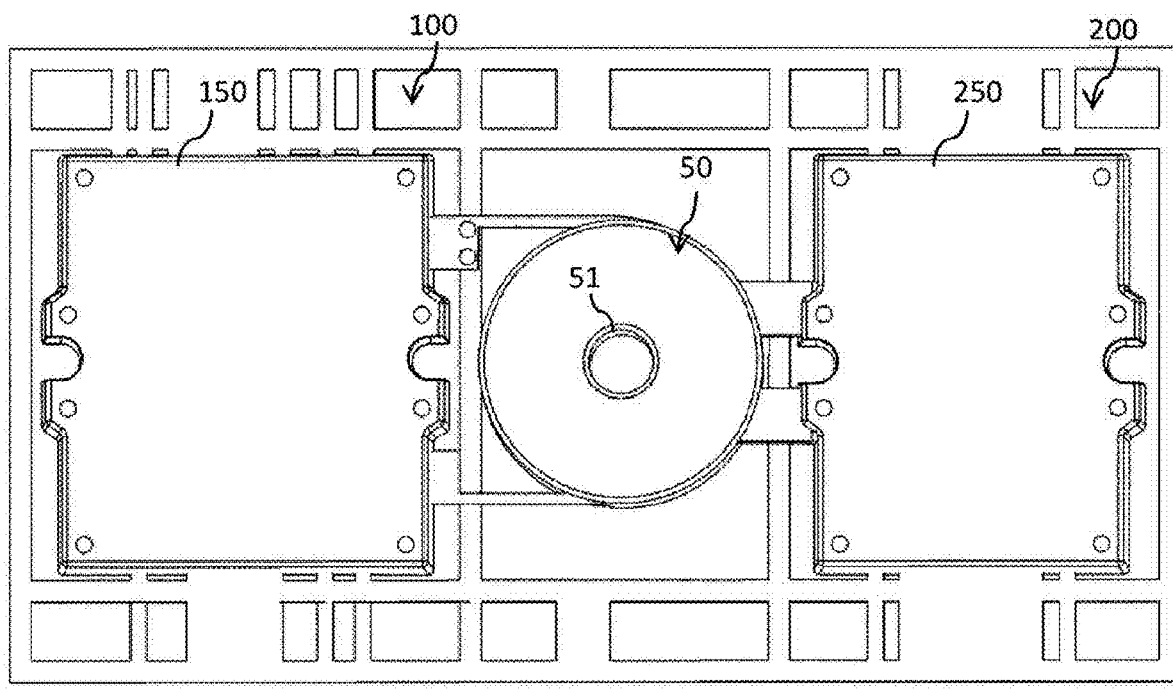
FIG. 2 is a plan view that illustrates a coil sealing part, a primary-side sealing part, and a secondary-side sealing part that can be used in the first embodiment of the present invention, and corresponds to FIG. 1.

As illustrated in FIGS. 1 and 2, a first electronic module 100 that has the primary-side electronic element 110 and the primary-side sealing part 150 may be provided. As illustrated in FIG. 1, the first electronic module 100 may have a primary-side substrate 120, a plurality of primary-side conductor layers 130 that is provided on one surface of the primary-side substrate 120, and a primary-side electronic element 110 that is provided on one surface of the primary-side conductor layer 130. The primary-side electronic element 110, a surface on the one side of the primary-side substrate 120, and a surface on the one side of the primary-side conductor layer 130 may be sealed with the primary-side sealing part 150 (see FIG. 2). The primary-side sealing part 150 may be constituted of primary-side sealing resin.

Figure 6:
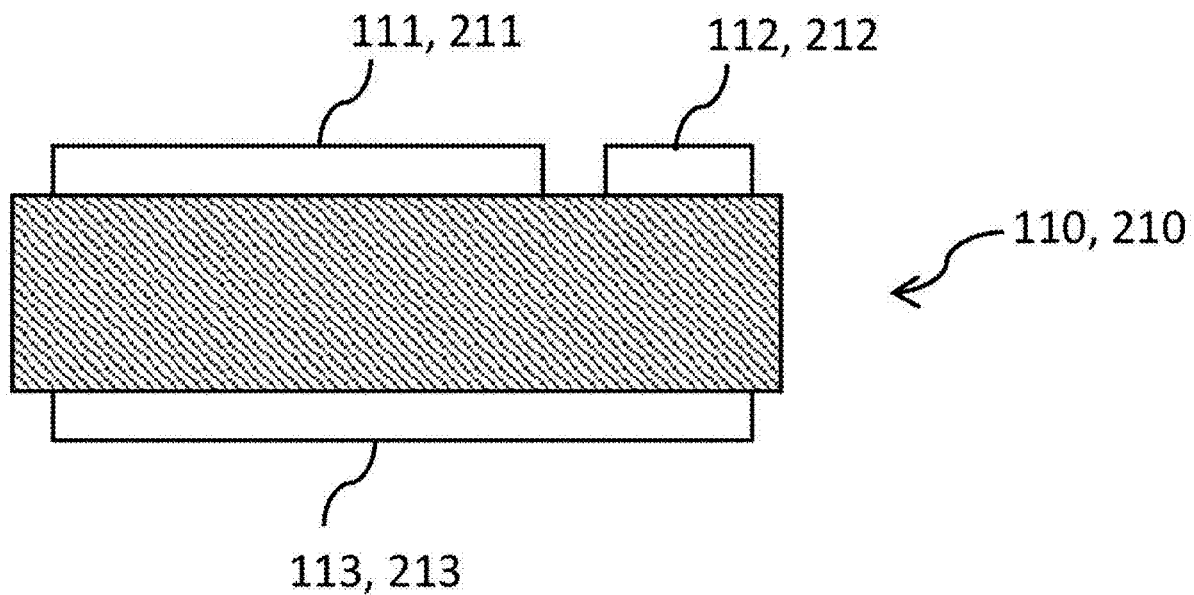
FIG. 6 is a side sectional view illustrating a primary-side electronic element and a secondary-side electronic element that can be used in the first embodiment of the present invention.

As illustrated in FIG. 6, a primary-side first electrode (for example, a source electrode) 111 and a primary-side second electrode (for example, a gate electrode) 112 may be provided on one surface of the primary-side electronic element 110, and a primary-side third electrode (for example, a drain electrode) 113 may be provided on another surface of the primary-side electronic element 110. The primary-side first electrode 111 and the primary-side conductor layer 130 may be connected via a primary-side first connector 116 (see FIG. 1) and a conductive adhesive (not illustrated) such as solder. The primary-side second electrode 112 and the primary-side conductor layer 130 may be connected via a primary-side second connector 117 (see FIG. 1) and a conductive adhesive such as solder. The primary-side third electrode 113 and the primary-side conductor layer 130 may be connected via a conductive adhesive such as solder. Furthermore, as illustrated in FIG. 7, the primary-side first electrode 111 may be provided on one surface of the primary-side electronic element 110, and the primary-side second electrode 112 may be provided on another surface of the primary-side electronic element 110.

As illustrated in FIGS. 1 and 2, a second electronic module 200 that has the secondary-side electronic element 210 and the secondary-side sealing part 250 may be provided. As illustrated in FIG. 1, the second electronic module 200 may have a secondary-side substrate 220, a plurality of secondary-side conductor layers 230 that is provided on one surface of the secondary-side substrate 220, and a secondary-side electronic element 210 that is provided on one surface of the secondary-side conductor layer 230. The secondary-side electronic element 210, a surface on the one side of the secondary-side substrate 220, and a surface on the one side of the secondary-side conductor layer 230 may be sealed with the secondary-side sealing part 250 (see FIG. 2).

The secondary-side sealing part 250 may be constituted of secondary-side sealing resin. The primary-side sealing resin and the secondary-side sealing resin may be constituted of the same resin material, or may be constituted of resin materials that are different from each other.

Figure 7:
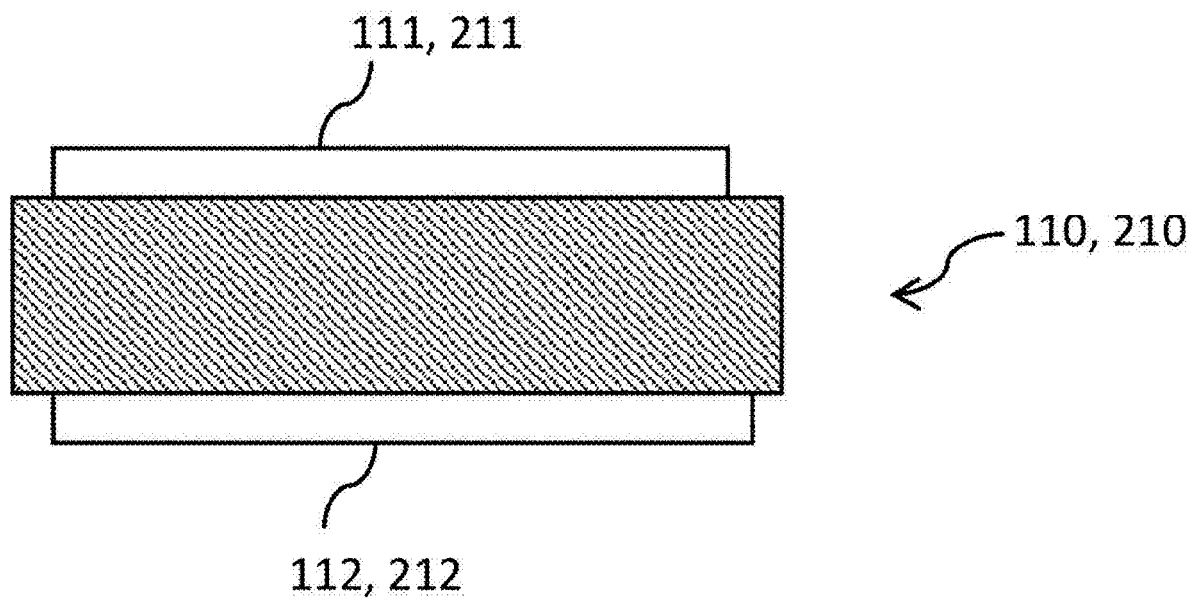
FIG. 7 is a side sectional view illustrating another aspect of the primary-side electronic element and the secondary-side electronic element that can be used in the first embodiment of the present invention.

As illustrated in FIG. 7, a secondary-side first electrode 211 may be provided on one surface of the secondary-side electronic element 210, and a secondary-side second electrode 212 may be provided on another surface of the secondary-side electronic element 210. The secondary-side first electrode 211 and the secondary-side conductor layer 230 may be connected via a secondary-side first connector 216 (see FIG. 1) and a conductive adhesive such as solder. Furthermore, as illustrated in FIG. 6, the secondary-side first electrode (for example, a source electrode) 211 and the secondary-side second electrode (for example, a gate electrode) 212 may be provided on one surface of the secondary-side electronic element 210, and a secondary-side third electrode (for example, a drain electrode) 213 may be provided on another surface of the secondary-side electronic element 210. The secondary-side third electrode 213 and the secondary-side conductor layer 230 may be connected via a conductive adhesive such as solder.

Figure 4:
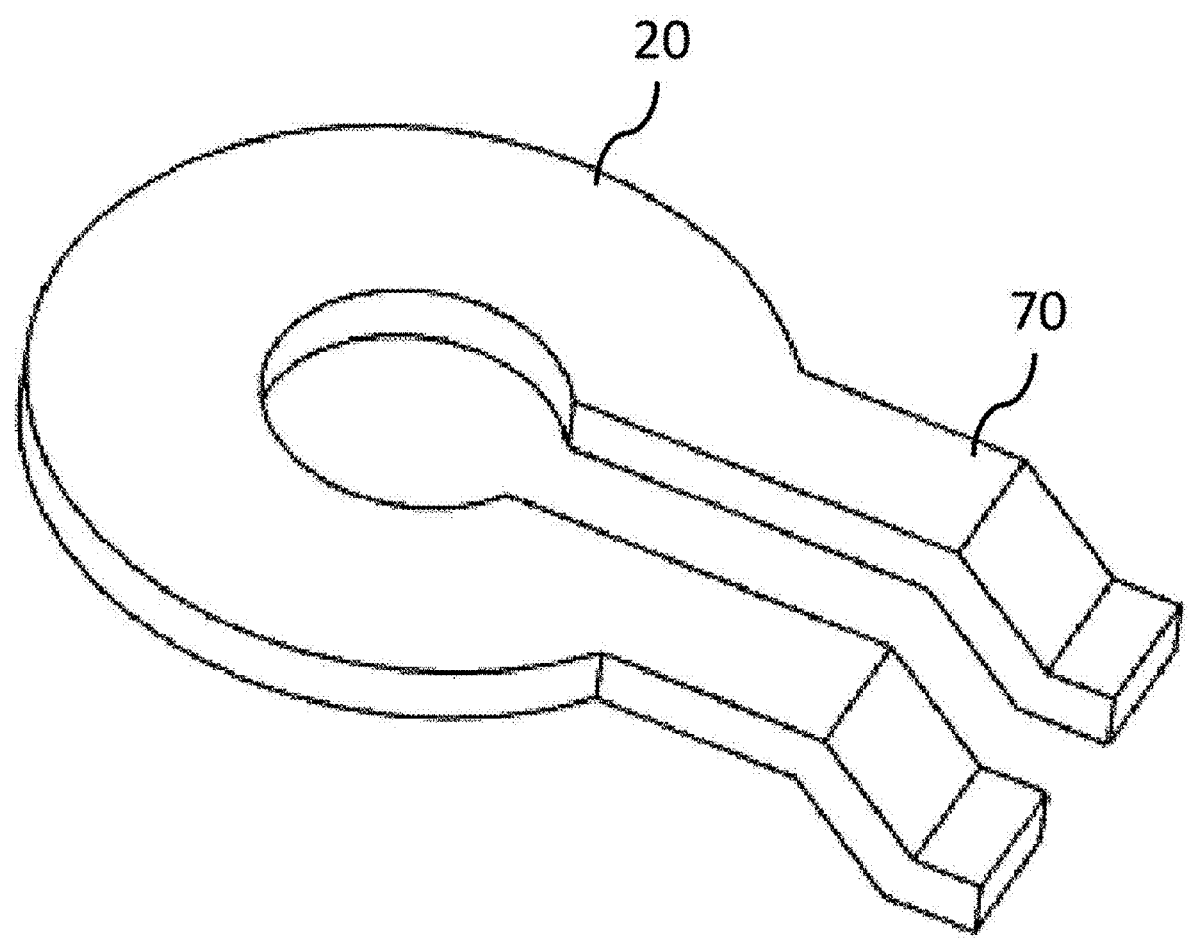
FIG. 4 is a perspective view illustrating the secondary coil that can be used in the first embodiment of the present invention.
Figure 5:
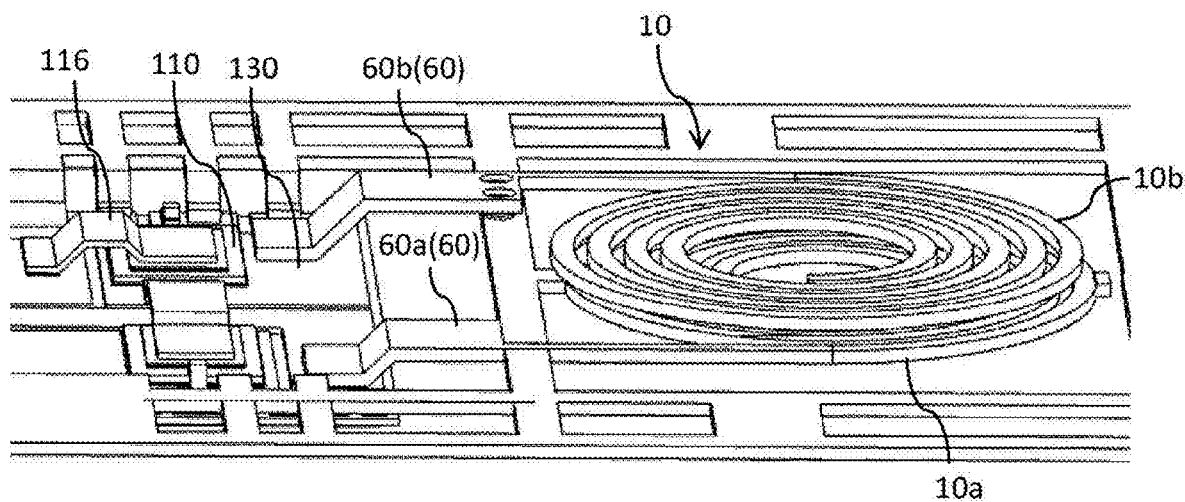
FIG. 5 is a perspective view illustrating the primary coil and a primary-side terminal that can be used in the first embodiment of the present invention.

As illustrated in FIG. 5, the primary coil 10 and a primary-side terminal 60 extending to an inside of the primary-side sealing part 150 may be integrated. As illustrated in FIG. 4, the secondary coil 20 and a secondary-side terminal 70 extending to an inside of the secondary-side sealing part 250 may be integrated. The primary-side terminal 60 may be provided via a conductive adhesive on a surface on the one side of the primary-side conductor layer 130 that is provided on the one side of the primary-side substrate 120. The secondary-side terminal 70 may be provided via a conductive adhesive on a surface on the one side of the secondary-side conductor layer 230 that is provided on the one side of the secondary-side substrate 220.

As illustrated in FIG. 3, the primary coil 10 may have a first coil 10a and a second coil 10b coupled to the first coil 10a. The second coil 10b may be provided on the one side of the first coil 10a, and the first coil 10a and the second coil 10b may be coupled by a connecting part 19 that extends along a first direction and has a linear shape. The connecting part 19 does not need to be completely parallel to the first direction, and may be inclined with respect to the first direction. An aspect of "extending along the first direction" also includes an aspect of extending to be inclined with respect to the first direction, as described above. The secondary coil 20 may be provided on the one side of the second coil 10b. When viewed from a side, the primary coil 10 may be provided on the one side relative to the primary-side substrate 120, and the secondary coil 20 may be provided on the one side relative to the primary coil 10.

As illustrated in FIG. 5, the first coil 10a and a primary-side first terminal 60a may be integrated. Furthermore, the second coil 10b and a primary-side second terminal 60b that is located on the one side relative to the primary-side first terminal 60a may be integrated.

The first coil 10a and the second coil 10b of the primary coil 10 may have the same number of turns, or may have numbers of turns that are different from each other. As an example, each of the numbers of turns of the first coil 10a and the second coil 10b of the primary coil 10 may be 5. The number of turns of the secondary coil 20 may be 1, or may be 2 or more. The number of turns of the secondary coil 20 may be less than 1, and the secondary coil 20 may have an aspect of not being wound one turn.

Figure 9:
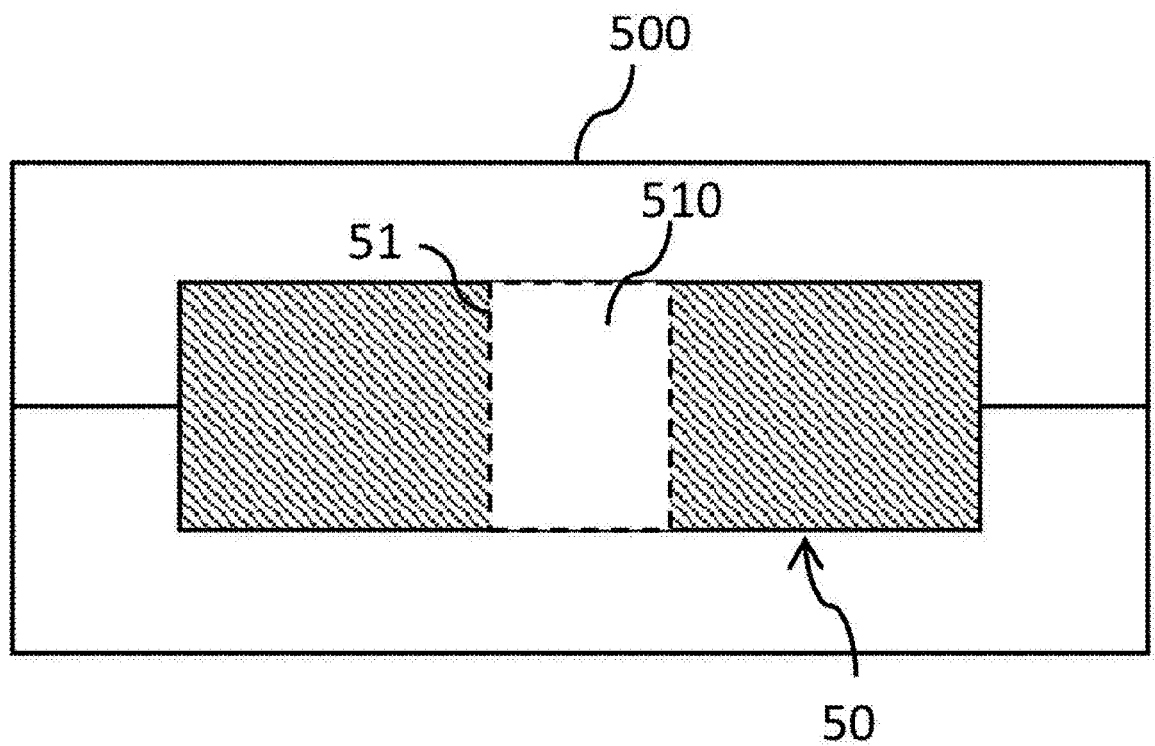
FIG. 9 is a side view illustrating a relationship between the coil sealing part and a core that can be used in the first embodiment of the present invention.

As illustrated in FIG. 9, a core 500 that passes through the primary coil 10 and the secondary coil 20 may be provided. The core 500 may have a leg part 510, and the leg part 510 may be provided to pass through an opening part 51 that is provided in the coil sealing part 50. The leg part 510 of the core 500 may be provided to abut onto an inner peripheral surface of the coil sealing part 50. An outer peripheral part of the core 500 may be provided to cover an outer periphery of the coil sealing part 50.

Effects

Next, an example of operations or effects according to the present embodiment having the configuration described above is described. All of the aspects described in the "Effects" can be employed in the configuration described above.

In the present embodiment, in a case where an aspect in which the coil sealing part 50 sealing the primary coil 10 and the secondary coil 20 and being made of sealing resin is provided has been employed, an insulating sheet that has been conventionally used does not need to be provided, and as a result, a space that is inevitably formed between insulating sheets can be eliminated. Therefore, thermal conductivity can be increased, and heat dissipation can be enhanced. However, an insulating member such as an insulating sheet does not need to be provided in the coil sealing part 50, as described above, but the insulating member such as an insulating sheet may be provided as needed.

As illustrated in FIG. 5, in a case where an aspect in which the primary coil 10 and the primary-side terminal 60 extending to the inside of the primary-side sealing part 150 are integrated has been employed, there is an advantage in which a member in which the primary coil 10 and the primary-side terminal 60 are integrated can be easily manufactured, by forming the primary coil 10 and the primary-side terminal 60 in a member such as a lead frame and removing an unnecessary portion. In the aspect illustrated in FIG. 5, the first coil 10a of the primary coil 10 and the primary-side first terminal 60a are constituted of a lead frame, and a member in which the first coil 10a and the primary-side first terminal 60a are integrated can be formed, by removing an outer frame of the lead frame. The second coil 10b of the primary coil 10 and the primary-side second terminal 60b may be constituted of a lead frame. In this case, by removing an outer frame of the lead frame, a member in which the second coil 10b and the primary-side second terminal 60b are integrated can be formed.

As illustrated in FIG. 5, by integrally configuring the primary coil 10 sealed with the coil sealing part 50 and the primary-side terminal 60 sealed with the primary-side sealing part 150, a wiring distance between a transformer having the primary coil 10 and the secondary coil 20 and the first electronic module 100 having the primary-side electronic element 110 can be reduced, and a reduction in size and high heat dissipation can be achieved. In particular, in a case where the primary-side electronic element 110 includes a switching element, the occurrence of noise causes a problem in some cases. However, in the present aspect, a reduction in the wiring distance can suppress the occurrence of noise. In particular, in the aspect illustrated in FIG. 1, the first electronic module 100 that has the primary-side substrate 120, the primary-side conductor layers 130, the primary-side electronic elements 110, and the primary-side sealing part 150 can be disposed at a distance that is close to a transformer unit that has the primary coil 10, the secondary coil 20, and the coil sealing part 50, and a device can also be reduced in size.

In a case where an aspect in which the secondary coil 20 and the secondary-side terminal 70 extending to the inside of the secondary-side sealing part 250 are integrated has been employed, a member in which a next coil and the secondary-side terminal 70 are integrated can be easily manufactured, by forming the secondary coil 20 and the secondary-side terminal 70 in a member such as a lead frame and removing an unnecessary portion.

As illustrated in FIG. 3, by integrally configuring the secondary coil 20 sealed with the coil sealing part 50 and the secondary-side terminal 70 sealed with the secondary-side sealing part 250, a wiring distance between the transformer having the primary coil 10 and the secondary coil 20 and the second electronic module 200 having the secondary-side electronic element 210 can be reduced, and a reduction in size and high heat dissipation can be achieved. In particular, in a case where the secondary-side electronic element 210 includes a switching element, the occurrence of noise causes a problem in some cases. However, in the present aspect, a reduction in the wiring distance can suppress the occurrence of noise. In particular, in the aspect illustrated in FIG. 1, the second electronic module 200 that has the secondary-side substrate 220, the secondary-side conductor layers 230, the secondary-side electronic elements 210, and the secondary-side sealing part 250 can be disposed at a distance that is close to the transformer unit that has the primary coil 10, the secondary coil 20, and the coil sealing part 50, and a device can also be reduced in size.

Figure 8:
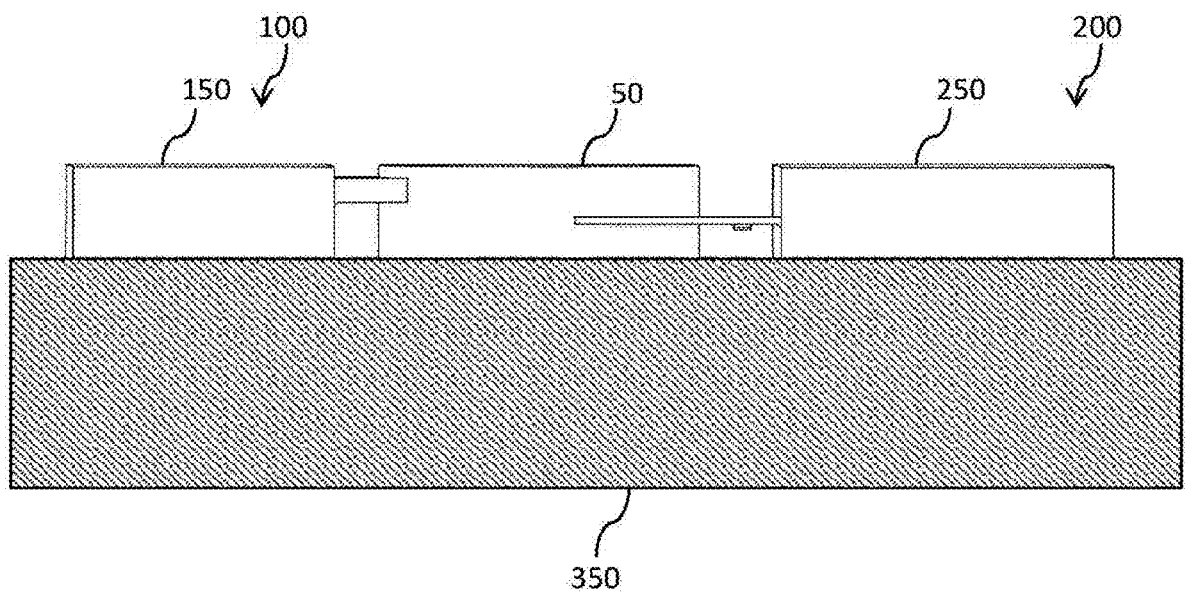
FIG. 8 is a side view illustrating a relationship between the coil sealing part, the primary-side sealing part, and the secondary-side sealing part, and a cooling body that can be used in the first embodiment of the present invention.

As illustrated in FIG. 8, a cooling body 350 such as a heat sink may be provided on another surface (a back surface) of the coil sealing part 50, another surface (a back surface) of the primary-side sealing part 150, and another surface (a back surface) of the secondary-side sealing part 250. In a case where such an aspect has been employed, there is an advantage in which the coil sealing part 50, the primary-side sealing part 150, and the secondary-side sealing part 250 can be cooled down by the cooling body 350.

Note that, in the present embodiment, as illustrated in FIG. 1, coils 10 and 20 part of which are formed of a lead frame and substrates 120 and 220 that are attached to the lead frame are also provided. Furthermore, as illustrated in FIG. 2, a transformer unit that has the coils 10 and 20 part of which are formed of the lead frame and the coil sealing part 50, and electronic modules 100 and 200 that have the substrates 120 and 220 attached to the lead frame and electronic elements 110 and 210 provided on the substrates 120 and 220 are also provided.

As the substrates 120 and 220, a ceramic substrate, an insulating resin layer, or the like can be employed. As the conductive adhesive, in addition to solder, an Ag-based or Cu-based material can also be used. Note that, as the substrates 120 and 220, a metal substrate on which a circuit pattern has been formed can also be used. In this case, the substrates 120 and 220 are also used as conductor layers 130 and 230.

Second Embodiment

Next, a second embodiment of the present invention is described.

Figure 10:
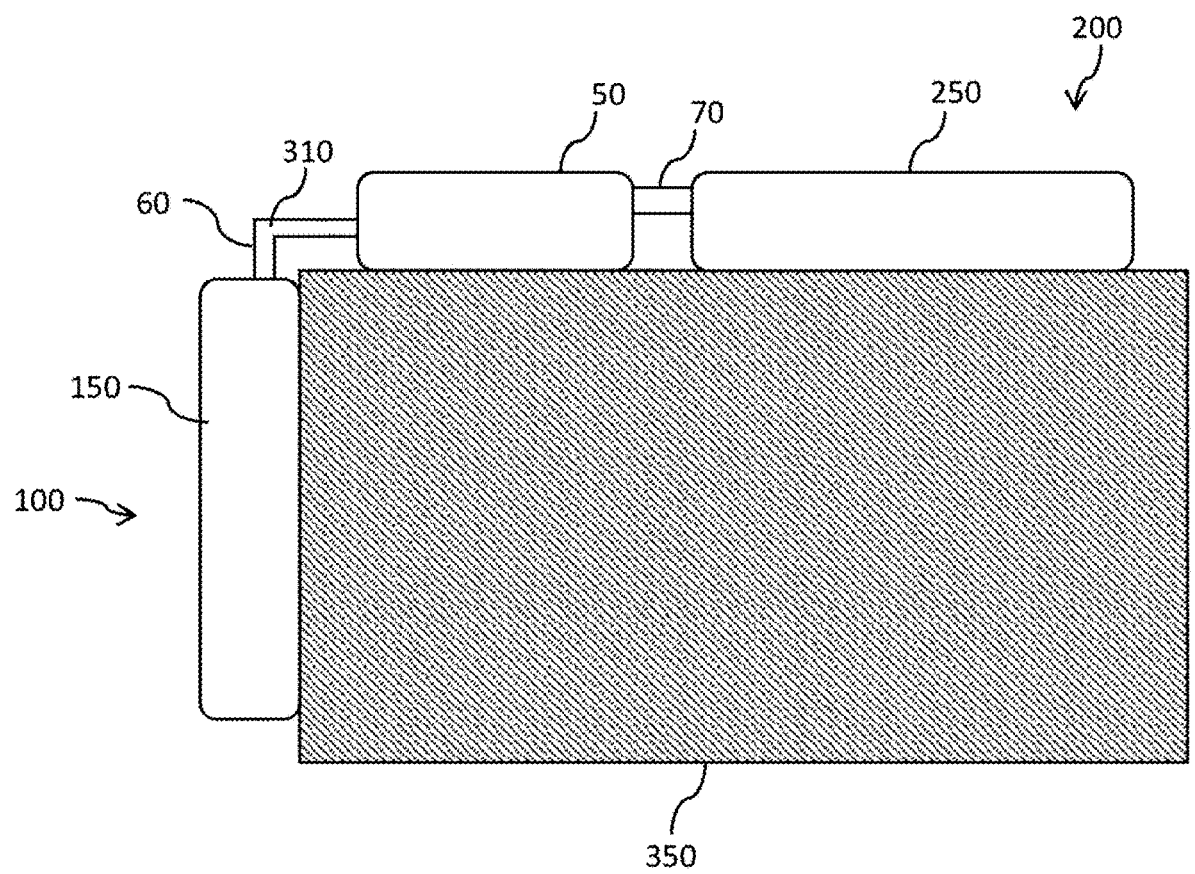
FIG. 10 is a side view illustrating a relationship between a coil sealing part, a primary-side sealing part, and a secondary-side sealing part, and a cooling body that can be used in a second embodiment of the present invention.

As illustrated in FIG. 10, in the present embodiment, an aspect in which a first bent part 310 is provided in the primary-side terminal 60 between the coil sealing part 50 and the primary-side sealing part 150 is employed. The other configuration is similar to a configuration in the first embodiment, and all of the aspects described in the first embodiment can be employed. The members described in the first embodiment are described by using the same reference signs.

According to the present embodiment, the coil sealing part 50 and the secondary-side sealing part 250 can be disposed along a plane direction, and the primary-side sealing part 150 can be disposed along a direction that is bent by a predetermined angle (for example, 60 degrees, 90 degrees, 120 degrees, or the like) with respect to the plane direction. Therefore, a size in a certain plane direction can be reduced.

Furthermore, such bending enables a reduction in an influence of noise or the like generated in the primary-side electronic element 110 sealed with the primary-side sealing part 150 on the secondary-side electronic element 210 sealed with the secondary-side sealing part 250, and also enables a reduction in an influence of noise or the like generated in the secondary-side electronic element 210 on the secondary-side electronic element 210 sealed with the primary-side sealing part 150.

In the present embodiment, similarly, the cooling body 350 such as a heat sink may be provided on the back surface of the coil sealing part 50, the back surface of the primary-side sealing part 150, and the back surface of the secondary-side sealing part 250. In a case where such an aspect has been employed, there is an advantage in which the coil sealing part 50, the primary-side sealing part 150, and the secondary-side sealing part 250 can be cooled down by the cooling body 350.

Third Embodiment

Next, a third embodiment of the present invention is described.

Figure 11:
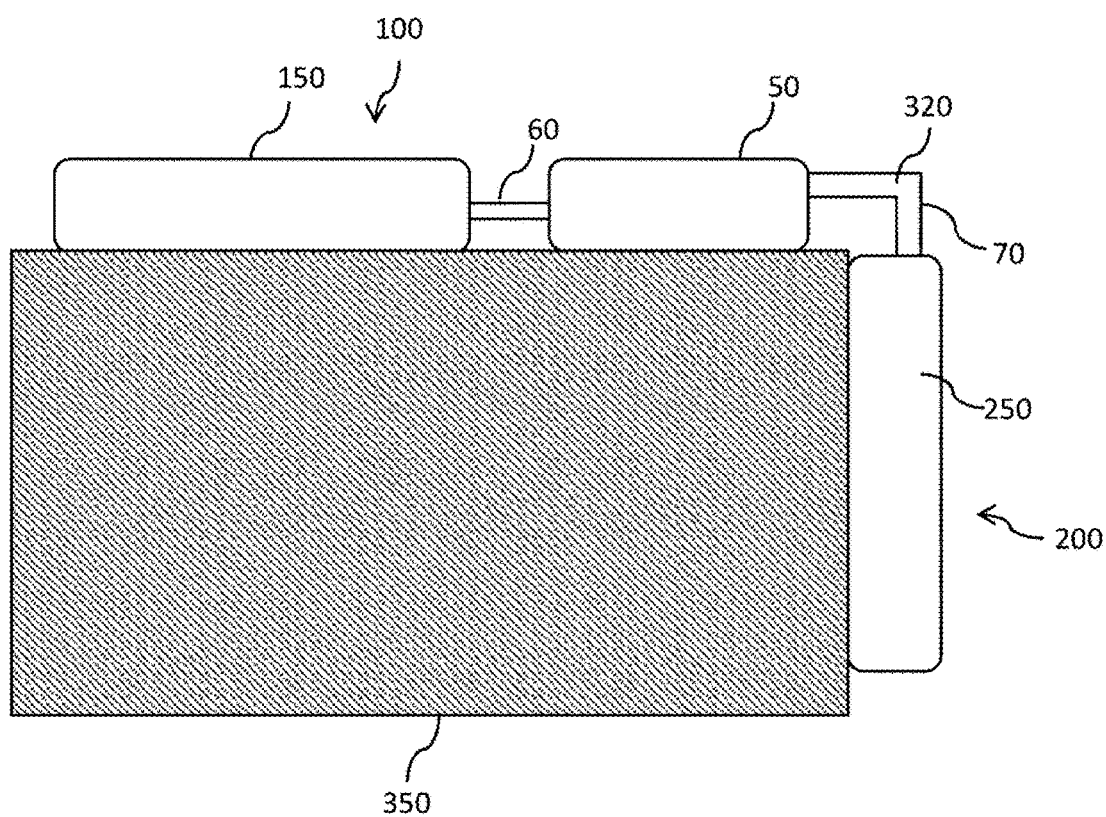
FIG. 11 is a side view illustrating a relationship between a coil sealing part, a primary-side sealing part, and a secondary-side sealing part, and a cooling body that can be used in a third embodiment of the present invention.

As illustrated in FIG. 11, in the present embodiment, an aspect in which a second bent part 320 is provided in the secondary-side terminal 70 between the coil sealing part 50 and the secondary-side sealing part 250 is employed. The other configuration is similar to a configuration in the first embodiment, and all of the aspects described in the first embodiment can be employed. The members described in the first embodiment are described by using the same reference signs.

According to the present embodiment, the coil sealing part 50 and the primary-side sealing part 150 can be disposed along a plane direction, and the secondary-side sealing part 250 can be disposed along a direction that is bent by a predetermined angle (for example, 60 degrees, 90 degrees, 120 degrees, or the like) with respect to the plane direction. Therefore, a size in a certain plane direction can be reduced.

Furthermore, such bending enables a reduction in an influence of noise or the like generated in the primary-side electronic element 110 sealed with the primary-side sealing part 150 on the secondary-side electronic element 210 sealed with the secondary-side sealing part 250, and also enables a reduction in an influence of noise or the like generated in the secondary-side electronic element 210 on the secondary-side electronic element 210 sealed with the primary-side sealing part 150.

In the present embodiment, similarly, the cooling body 350 such as a heat sink may be provided on the back surface of the coil sealing part 50, the back surface of the primary-side sealing part 150, and the back surface of the secondary-side sealing part 250. In a case where such an aspect has been employed, there is an advantage in which the coil sealing part 50, the primary-side sealing part 150, and the secondary-side sealing part 250 can be cooled down by the cooling body 350.

Fourth Embodiment

Next, a fourth embodiment of the present invention is described.

Figure 12:
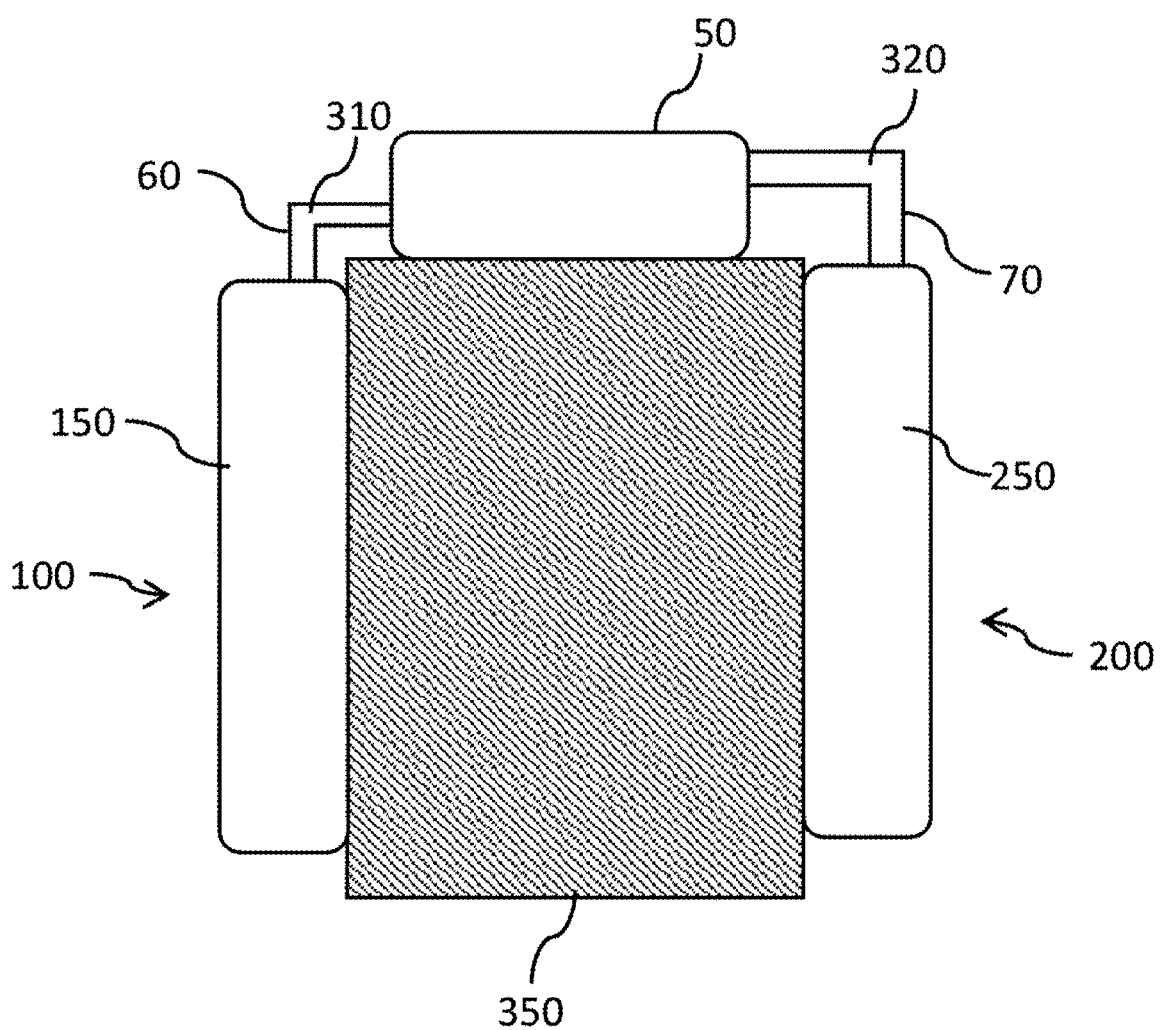
FIG. 12 is a side view illustrating a relationship between a coil sealing part, a primary-side sealing part, and a secondary-side sealing part, and a cooling body that can be used in a fourth embodiment of the present invention.

As illustrated in FIG. 12, in the present embodiment, an aspect in which the first bent part 310 is provided in the primary-side terminal 60 between the coil sealing part 50 and the primary-side sealing part 150 and the second bent part 320 is provided in the secondary-side terminal 70 between the coil sealing part 50 and the secondary-side sealing part 250 is employed. The other configuration is similar to a configuration in the first embodiment, and all of the aspects described in the first embodiment can be employed. The members described in the first embodiment are described by using the same reference signs.

According to the present embodiment, the coil sealing part 50, the primary-side sealing part 150, and the secondary-side sealing part 250 can be respectively disposed along plane directions that are different from each other. Furthermore, the primary-side sealing part 150 and the secondary-side sealing part 250 can also be disposed in such a way that respective back surfaces face each other. The coil sealing part 50 and the primary-side sealing part 150 may be disposed to be bent by a first angle (for example, 60 degrees, 90 degrees, 120 degrees, or the like) with respect to each other, and the coil sealing part 50 and the secondary-side sealing part 250 may be disposed to be bent by a second angle (for example, 60 degrees, 90 degrees, 120 degrees, or the like) with respect to each other.

In the present embodiment, similarly, the cooling body 350 such as a heat sink may be provided on the back surface of the coil sealing part 50, the back surface of the primary-side sealing part 150, and the back surface of the secondary-side sealing part 250. In a case where such an aspect has been employed, there is an advantage in which the coil sealing part 50, the primary-side sealing part 150, and the secondary-side sealing part 250 can be cooled down by the cooling body 350. As an example, in a case where, for example, an aspect in which the coil sealing part 50 and the primary-side sealing part 150 are disposed to be bent by 90 degrees with respect to each other and the coil sealing part 50 and the secondary-side sealing part 250 are disposed to be bent by 90 degrees with respect to each other has been employed, disposition can be performed in such a way that the back surface of the coil sealing part 50, the back surface of the primary-side sealing part 150, and the back surface of the secondary-side sealing part 250 respectively abut onto three surfaces of the cooling body 350 that is made of a heat sink or the like, and there is an advantage in which a high cooling effect can be expected.

Figure 13:
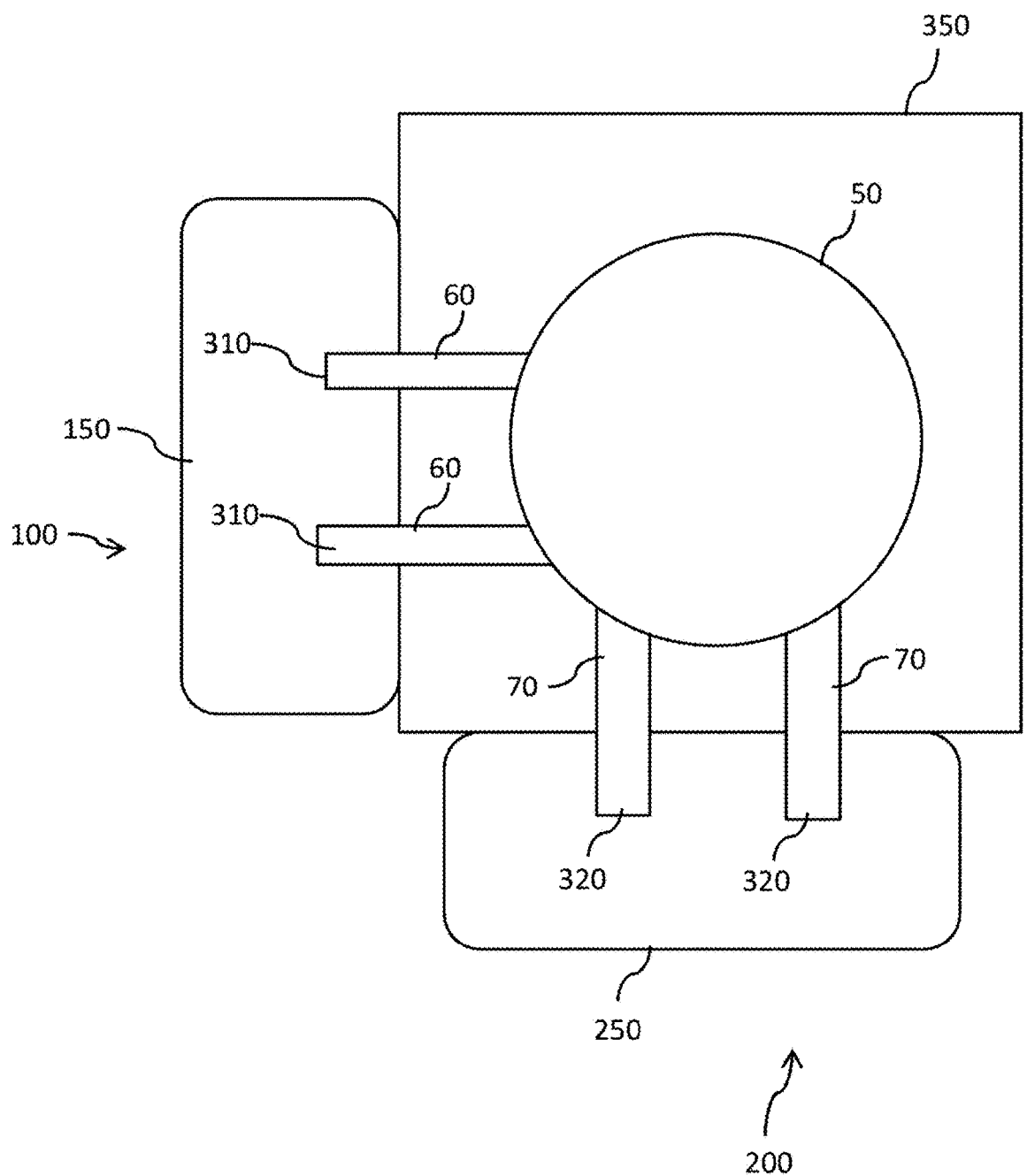
FIG. 13 is a plan view illustrating an example of a disposition aspect of a primary-side sealing part and a secondary-side sealing part that can be used in an embodiment of the present invention.

The primary-side terminal 60 and the secondary-side terminal 70 do not need to be provided linearly. For example, the primary-side terminal 60 and the secondary-side terminal 70 may be provided to be orthogonal to each other in a plane direction, or may be provided to cross each other at an angle that is different from 90 degrees in the plane direction. FIG. 13 illustrates an aspect in which the primary-side terminal 60 and the secondary-side terminal 70 are orthogonal to each other in the plane direction. As described above, according to the present embodiment, the primary-side sealing part 150 and the secondary-side sealing part 250 can be disposed in any direction of the plane direction, and can be bent by using the first bent part 310 and the second bent part 320.

The description of each embodiment and the disclosure of the figures described above are merely examples for explaining the invention described in the claims, and the invention described in the claims is not limited by the description of the embodiment or the disclosure of the figures described above. In addition, the recitation of the claims at the original application is merely an example, and the description of the claims can be appropriately changed based on the description of the specification, the figures, and the like.

REFERENCE SIGNS LIST

10 Primary coil
10a First coil
10b Second coil
20 Secondary coil
50 Coil sealing part
60 Primary-side terminal
70 Secondary-side terminal
100 First electronic module
110 Primary-side electronic element
120 Primary-side substrate
130 Primary-side conductor layer
150 Primary-side sealing part
200 Second electronic module
210 Secondary-side electronic element
220 Secondary-side substrate
230 Secondary-side conductor layer
250 Secondary-side sealing part
310 First bent part
320 Second bent part
350 Cooling body

The invention claimed is:

1. An electronic device comprising:
a primary coil;
a secondary coil disposed to face the primary coil;
a coil sealing part sealing the primary coil and the secondary coil and being made of sealing resin;
a primary-side sealing part sealing a primary-side electronic element electrically connected to the primary coil; and
a secondary-side sealing part sealing a secondary-side electronic element electrically connected to the secondary coil;
wherein the coil sealing part, the primary-side sealing part and the secondary-side sealing part are separated from each other, and
wherein a gap in a plane direction is configured to exist between the coil sealing part and the primary-side sealing part, and a gap in a plane direction is configured to exist between the coil sealing part and the secondary-side sealing part,
wherein the primary coil and a primary-side terminal extending to an inside of the primary-side sealing part are integrated and made from a lead frame, or the secondary coil and a secondary-side terminal extending to an inside of the secondary-side sealing part are integrated and made from a lead frame.

2. The electronic device according to claim 1, wherein the primary coil and the primary-side terminal extending to the inside of the primary-side sealing part are integrated.

3. The electronic device according to claim 1, wherein the secondary coil and the secondary-side terminal extending to the inside of the secondary-side sealing part are integrated.

4. The electronic device according to claim 1, wherein the primary coil has a first coil and a second coil coupled to the first coil.

5. The electronic device according to claim 1 further comprising: a first electronic module that has the primary-side electronic element and the primary-side sealing part, wherein the first electronic module has a primary-side substrate and a primary-side conductor layer provided on the primary-side substrate.

6. The electronic device according to claim 1 further comprising: a second electronic module that has the secondary-side electronic element and the secondary-side sealing part, wherein the second electronic module has a secondary-side substrate and a secondary-side conductor layer provided on the secondary-side substrate.

7. The electronic device according to claim 1, wherein the primary coil and the primary-side terminal extending to the inside of the primary-side sealing part are integrated, and wherein the primary-side terminal is bent between the coil sealing part and the primary-side sealing part.

8. The electronic device according to claim 1, wherein the secondary coil and the secondary-side terminal extending to the inside of the secondary-side sealing part are integrated, and wherein the secondary-side terminal is bent between the coil sealing part and the secondary-side sealing part.

9. The electronic device according to claim 1, wherein the primary coil and the primary-side terminal extending to the inside of the primary-side sealing part are integrated, wherein the primary-side terminal is bent between the coil sealing part and the primary-side sealing part, wherein the secondary coil and the secondary-side terminal extending to the inside of the secondary-side sealing part are integrated, wherein the secondary-side terminal is bent between the coil sealing part and the secondary-side sealing part, and wherein a back surface of the coil sealing part, a back surface of the primary-side sealing part, and a back surface of the secondary-side sealing part is able to abut onto a cooling body.

\* \* \* \* \*